(No Model.)

T. M. WILSON.
LUBRICATOR.

No. 263,374. Patented Aug. 29, 1882.

WITNESSES
Jacob W. Locker
C. P. Jacobs

INVENTOR
Thos. M. Wilson

UNITED STATES PATENT OFFICE.

THOMAS M. WILSON, OF INDIANAPOLIS, INDIANA.

LUBRICATOR.

SPECIFICATION forming part of Letters Patent No. 263,374, dated August 29, 1882.

Application filed April 21, 1882. (No model.)

*To all whom it may concern:*

Be it known that I, THOMAS M. WILSON, of Indianapolis, Indiana, have invented a new and useful Improvement in Lubricators, of which the following is a description, using the accompanying drawings as an illustration, in the figures of which similar letters indicate similar parts.

The object of my invention is to connect the oil-cup with the bearings of a machine so that they may be lubricated while in motion; and I effect this result by connecting the oil-cup, which is rigidly attached to a support, with the bearing to be oiled by means of telescopic tubes so arranged that the oil is delivered to the bearing at right angles to the plane of motion.

The drawings illustrate one form in which my device may be used—that of an attachment to the cross-head of an engine.

Figure 1:
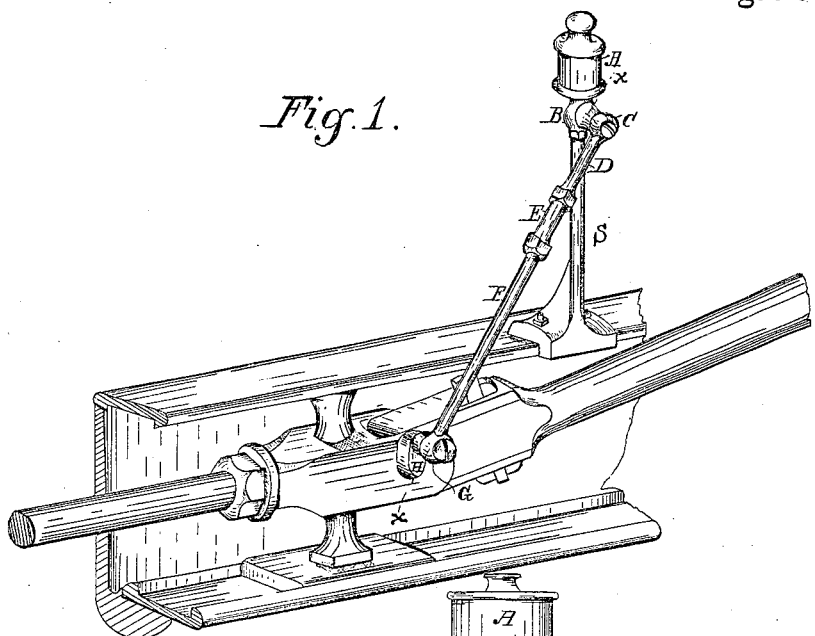
Figure 2:
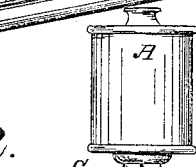
Figure 3:
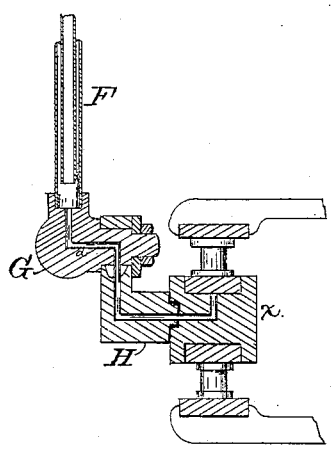
Figure 4:
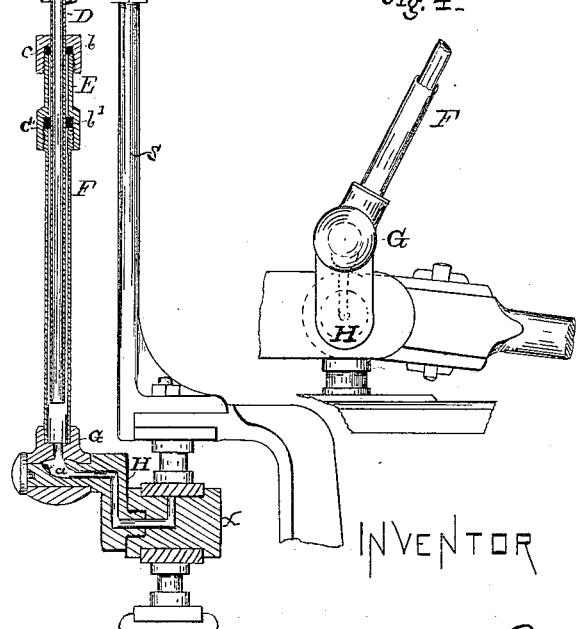

In Figure 1 is shown a perspective view of my device attached to the cross-head of an engine. Fig. 2 is a vertical section of the tubes, showing the interior construction. Fig. 3 is a sectional view, showing a second method of attaching the tubes to the cross-head, of which Fig. 4 is a front view.

In the drawings, A represents an oil-cup secured to the frame by the standard S, the connection between the oil-cup and the standard being made by the casting B, on one end of which is turned a wrist, the interior of the casting being hollow to conduct the oil to the pipes.

C is a hollow casting or union which oscillates upon the wrist of the casting B, and into which is screwed the inner reciprocating pipe or tube, D. This pipe D moves up and down freely in an outer tube, F. To the tube F is screwed the sleeve E by its gland $c'$, and the upper end of this sleeve E is screwed into the gland $c$.

$b$ and $b'$ are leather gaskets, which serve as guides for the inner tube, D, and prevent leakage.

The lower end of the outer pipe, F, screws into a hollow casting, G, Fig. 2, which oscillates upon a wrist turned on the block H, which in turn is screwed into the side of the cross-head or secured thereto by bolts. The block H is also hollow, and this opening is enlarged just below its union with the casting G, to prevent any cutting off of the oil-supply, and there is an opening in the cross-head $x$, through which the oil flows to the bearing to be lubricated.

Another method of attaching the tubes to the cross-head is shown in section in Fig. 3.

My device operates as follows: Power being applied to the engine, as the slide of the cross-head moves forward the inner tube, D, oscillates upon the wrist near the oil-cup, the outer tube oscillates upon the wrist of the block H, the inner tube drawing out of the outer lengthens the connections, and the oil flows freely to the bearings as the cross-head travels forward and backward, a constant supply of oil being kept up, the openings in the castings C and G being enlarged to prevent any cutting off of the flow of oil.

What I claim, and desire to secure by Letters Patent, is—

1. The combination of the oil-cup, the support or standard having the projection or wrist formed on its upper end, and having a channel for the oil made through it, connecting-pipes, casting G, block H, and cross-head $x$, the block, casting, and cross-head having an oil-channel made through them, substantially as shown.

2. The combination of the oil-cup A, union B, casting C, tubes D and F, hollow casting G, block H, sleeve E, and gland $c$, substantially as and for the purposes described.

In witness whereof I have hereunto set my hand this 18th day of April, 1882.

THOS. M. WILSON.

Witnesses:
C. P. JACOBS,
C. S. SPRITZ.